(12) United States Patent
Kollar et al.

(10) Patent No.: US 10,356,680 B1
(45) Date of Patent: Jul. 16, 2019

(54) VOICE RETAINABILITY EVALUATION

(71) Applicant: NOKIA TECHNOLOGIES OY, Espoo (FI)

(72) Inventors: Martin Kollar, Kosice (SK); Arkadiusz Zieba, Gdansk (PL); Anatoly Andrianov, Schaumburg, IL (US)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 15/971,436

(22) Filed: May 4, 2018

(51) Int. Cl.
*H04W 36/00* (2009.01)
*H04W 36/28* (2009.01)
*H04W 36/30* (2009.01)

(52) U.S. Cl.
CPC ....... *H04W 36/28* (2013.01); *H04W 36/0027* (2013.01); *H04W 36/0044* (2013.01); *H04W 36/0072* (2013.01); *H04W 36/0077* (2013.01); *H04W 36/30* (2013.01)

(58) Field of Classification Search
CPC ..... H04W 36/30; H04W 36/18; H04W 36/08; H04W 36/14; H04W 36/12; H04W 36/32; H04W 36/0083; H04W 36/0055; H04W 24/00
USPC ................ 455/436–438, 67.11, 67.13, 226.1
See application file for complete search history.

(56) References Cited

U.S. PATENT DOCUMENTS

| | | | |
|---|---|---|---|
| 9,264,945 B2* | 2/2016 | Ramachandran | H04W 36/0022 |
| 2007/0249291 A1* | 10/2007 | Nanda | H04W 36/0083 455/73 |
| 2013/0065595 A1* | 3/2013 | Hu | H04W 36/0033 455/436 |
| 2016/0234734 A1* | 8/2016 | Chaudhuri | H04W 36/0083 |

* cited by examiner

*Primary Examiner* — Temica M Beamer
(74) *Attorney, Agent, or Firm* — Squire Patton Boggs (US) LLP

(57) ABSTRACT

An apparatus comprising at least one processor and at least one memory including computer program code. The at least one memory and the computer program code are configured to, with the at least one processor, cause the apparatus to receive an initial user equipment message from a target cell, transmit an initial context setup request message to the target cell including one or more service indicators, receive an initial context setup response message from the target cell, and calculate a drop ratio associated with a double S1 connection based upon a number of abnormal radio access bearer releases subtracted from a number of radio access bearer releases associated with the successful double S1 connection divided by a total number of radio access bearer releases. The one or more service indicators are determined based upon the received initial user equipment message.

20 Claims, 4 Drawing Sheets

VOICE RETAINABILITY EVALUATION

BACKGROUND

Field

Certain embodiments may relate to communication systems. For example, some embodiments may relate to wireless broadband data networks including fixed network infrastructure, radio access equipment, and portable end user equipment.

Description of the Related Art

Retainability key performance indicators (KPIs) based on evolved packet system (EPS) radio access bearer (RAB) release counters monitor network performance from the perspective of a user equipment. However, challenges arise in evaluating these KPIs for a double S1 and/or double next generation (NG) release. For example, during a voice over long-term evolution (VoLTE) call, user equipment may lose synchronization, and transmit a radio resource control (RRC) reestablishment message to an unprepared target cell.

The unprepared target cell may send an RRC reestablishment rejection message to the UE. In response, the UE may enter an idle state, and send a new RRC request to the target cell. When the mobility management entity (MME) receives a service request from the target cell, the target cell may already have UE context information from the source cell since radio link failure (RLF) does not expire at the source cell. Thus, the MME may identify that there are two UE contexts for the same UE, such as double S1 and/or double NG. The MME will send a UE context release command to a source cell. This UE context release command is counted as either normal or abnormal, based upon a cause value of the UE context release command. From the perspective of the UE, however, the UE context release command is considered normal and not as a dropped call in case the E-RAB has been successfully re-established in the target cell. During VoLTE services, this may be inaccurately considered as a dropped call by the UE.

According to 3rd Generation Partnership Project (3GPP) Technical Specification (TS) 36.413, chapter 8.3.3.1, the purpose of the UE Context Release procedure is to enable the MME to order the release of the UE-associated logical connection for various reasons, e.g., completion of a transaction between the UE and the EPC, completion of successful handover, completion of handover cancellation, or release of the old UE-associated logical S1-connection when two UE-associated logical S1-connections toward the same UE is detected after the UE has initiated the establishment of a new UE-associated logical S1-connection. Thus, 3GPP does not prevent the MME from sending any cause information within the UE context release command. Currently, the cause information is MME vendor-specific, as indicated in Table 1:

TABLE 1

| MME Vendor | Cause | Counted As |
|---|---|---|
| Nokia | NAS normal | normal |
| Cisco | NAS normal | normal |
| Alcatel-Lucent | RNL UE connectivity lost | abnormal |
| Ericsson | RNL: E-UTRAN Generated Reason | abnormal |

Similarly, in fifth-generation (5G) wireless technologies where a quality of service flow identity (QFI) 1 call is occurring, UE may lose synchronization and send a RRC reestablishment message to an unprepared target cell, which will then send an RRC reestablishment rejection message to the UE. In response, the UE may enter an idle state, and send a new RRC request to the target cell. When an authentication management field (AMF) receives a service request from the target cell, it may already have UE context information from the source cell since RLF does not expire at the source cell, so the AMF will identify that there are two UE contexts for the same UE, such as double NG. AMF will send a UE context release command to a source cell. This UE context release command is counted as either normal or abnormal, based upon a cause value of the UE context release command. Again, from the perspective of the UE, the UE context release command is considered normal and not as a dropped call. During VoLTE services, this may also be inaccurately considered as a dropped call by the UE.

SUMMARY

In accordance with an embodiment, a method may include receiving an initial user equipment message from a target cell. The method may further include transmitting an initial context setup request message to the target cell. The method may further include receiving an initial context setup response message from the target cell including one or more service indicators. The method may further include calculating a drop ratio associated with a double S connection based upon a number of abnormal radio access bearer releases subtracted from a number of radio access bearer releases associated with the successful double S1 connection divided by a total number of radio access bearer releases. The one or more service indicators may be determined based upon the received initial user equipment message.

In accordance with an embodiment, an apparatus may include at least one processor and at least one memory including computer program code. The at least one memory and the computer program code can be configured to, with the at least one processor, cause the apparatus to at least receive an initial user equipment message from a target cell. The at least one memory and the computer program code can be configured to, with the at least one processor, further cause the apparatus to at least transmit an initial context setup request message to the target cell. The at least one memory and the computer program code can be configured to, with the at least one processor, may further cause the apparatus to at least receive an initial context setup response message from the target cell including one or more service indicators. The at least one memory and the computer program code can be configured to, with the at least one processor, may further cause the apparatus to calculate a drop ratio associated with a double S1 connection based upon a number of abnormal radio access bearer releases subtracted from a number of radio access bearer releases associated with the successful double S1 connection divided by a total number of radio access bearer releases. The one or more service indicators may be determined based upon the received initial user equipment message.

In accordance with an embodiment, an apparatus may include means for receiving an initial user equipment message from a target cell. The apparatus may further include means for transmitting an initial context setup request message to the target cell. The apparatus may further include means for receiving an initial context setup response message from the target cell including one or more service indicators. The apparatus may further include means for calculating a drop ratio associated with a double S1 connection based upon a number of abnormal radio access bearer releases subtracted from a number of radio access bearer releases associated with the successful double S1 connection divided by a total number of radio access bearer releases. The one or more service indicators may be determined based upon the received initial user equipment message.

In accordance with an embodiment, a non-transitory computer readable medium can, in certain embodiments, be encoded with instructions that may, when executed in hardware, perform a process. The process may include a method that may receive an initial user equipment message from a target cell. The process may further include a method that may transmit an initial context setup request message to the target cell. The process may further include a method that may receive an initial context setup response message from the target cell including one or more service indicators. The process may further include a method that may calculate a drop ratio associated with a double S1 connection based upon a number of abnormal radio access bearer releases subtracted from a number of radio access bearer releases associated with the successful double S1 connection divided by a total number of radio access bearer releases. The one or more service indicators may be determined based upon the received initial user equipment message.

In accordance with an embodiment, a computer program product may, according to certain embodiments, encode instructions for performing a process. The process may include a method that may receive an initial user equipment message from a target cell. The process may further include a method that may transmit an initial context setup request message to the target cell. The process may further include a method that may receive an initial context setup response message from the target cell including one or more service indicators. The process may further include a method that may calculate a drop ratio associated with a double S1 connection based upon a number of abnormal radio access bearer releases subtracted from a number of radio access bearer releases associated with the successful double S1 connection divided by a total number of radio access bearer releases. The one or more service indicators may be determined based upon the received initial user equipment message.

In accordance with an embodiment, an apparatus may include circuitry configured to receive an initial user equipment message from a target cell. The apparatus may include circuitry further configured to transmit an initial context setup request message to the target cell. The apparatus may include circuitry further configured to receive an initial context setup response message from the target cell including one or more service indicators. The apparatus may include circuitry further configured to calculate a drop ratio associated with a double S1 connection based upon a number of abnormal radio access bearer releases subtracted from a number of radio access bearer releases associated with the successful double S1 connection divided by a total number of radio access bearer releases. The one or more service indicators may be determined based upon the received initial user equipment message.

In accordance with an embodiment, a method may include transmitting an initial user equipment message to a mobility management entity. The method may further include receiving an initial context setup request from the mobility management entity. The method may further include transmitting an initial context setup response message to the mobility management entity including one or more service indicators. The one or more service indicators are related to a calculation of a drop ratio associated with a double S1 connection based upon a number of abnormal radio access bearer releases subtracted from a number of radio access bearer releases associated with the successful double S1 connection divided by a total number of radio access bearer releases.

In accordance with an embodiment, an apparatus may include at least one processor and at least one memory including computer program code. The at least one memory and the computer program code can be configured to, with the at least one processor, cause the apparatus to at least transmit an initial user equipment message to a mobility management entity. The at least one memory and the computer program code can be configured to, with the at least one processor, further cause the apparatus to at least receive an initial context setup request from the mobility management entity. The at least one memory and the computer program code can be configured to, with the at least one processor, further cause the apparatus to at least transmit an initial context setup response message to the mobility management entity including one or more service indicators. The one or more service indicators are related to a calculation of a drop ratio associated with a double S1 connection based upon a number of abnormal radio access bearer releases subtracted from a number of radio access bearer releases associated with the successful double S1 connection divided by a total number of radio access bearer releases.

In accordance with an embodiment, an apparatus may include means for transmitting an initial user equipment message to a mobility management entity. The apparatus may further include means for receiving an initial context setup request from the mobility management entity. The apparatus may further include means for transmitting an initial context setup response message to the mobility management entity including one or more service indicators. The one or more service indicators are related to a calculation of a drop ratio associated with a double S1 connection based upon a number of abnormal radio access bearer releases subtracted from a number of radio access bearer releases associated with the successful double S1 connection divided by a total number of radio access bearer releases.

In accordance with an embodiment, a non-transitory computer readable medium can, in certain embodiments, be encoded with instructions that may, when executed in hardware, perform a process. The process may include a method that may transmit an initial user equipment message to a mobility management entity. The process may include a method that may further receive an initial context setup request from the mobility management entity. The process may include a method that may further transmit an initial context setup response message to the mobility management entity including one or more service indicators. The one or more service indicators are related to a calculation of a drop ratio associated with a double S1 connection based upon a number of abnormal radio access bearer releases subtracted from a number of radio access bearer releases associated with the successful double S1 connection divided by a total number of radio access bearer releases.

In accordance with an embodiment, a computer program product may, according to certain embodiments, encode instructions for performing a process. The process may include a method that may transmit an initial user equipment message to a mobility management entity. The process may include a method that may further receive an initial context setup request from the mobility management entity. The process may include a method that may further transmit an initial context setup response message to the mobility management entity including one or more service indicators. The one or more service indicators are related to a calculation of a drop ratio associated with a double S1 connection based upon a number of abnormal radio access bearer releases subtracted from a number of radio access bearer releases associated with the successful double S1 connection divided by a total number of radio access bearer releases.

In accordance with an embodiment, an apparatus may include circuitry configured to transmit an initial user equipment message to a mobility management entity. The apparatus may include circuitry further configured to receive an initial context setup request from the mobility management entity. The apparatus may include circuitry further configured to transmit an initial context setup response message to the mobility management entity including one or more service indicators. The one or more service indicators are related to a calculation of a drop ratio associated with a double S1 connection based upon a number of abnormal radio access bearer releases subtracted from a number of radio access bearer releases associated with the successful double S1 connection divided by a total number of radio access bearer releases.

BRIEF DESCRIPTION OF THE DRAWINGS

For proper understanding of this disclosure, reference should be made to the accompanying drawings, wherein.

DETAILED DESCRIPTION

Figure 1:
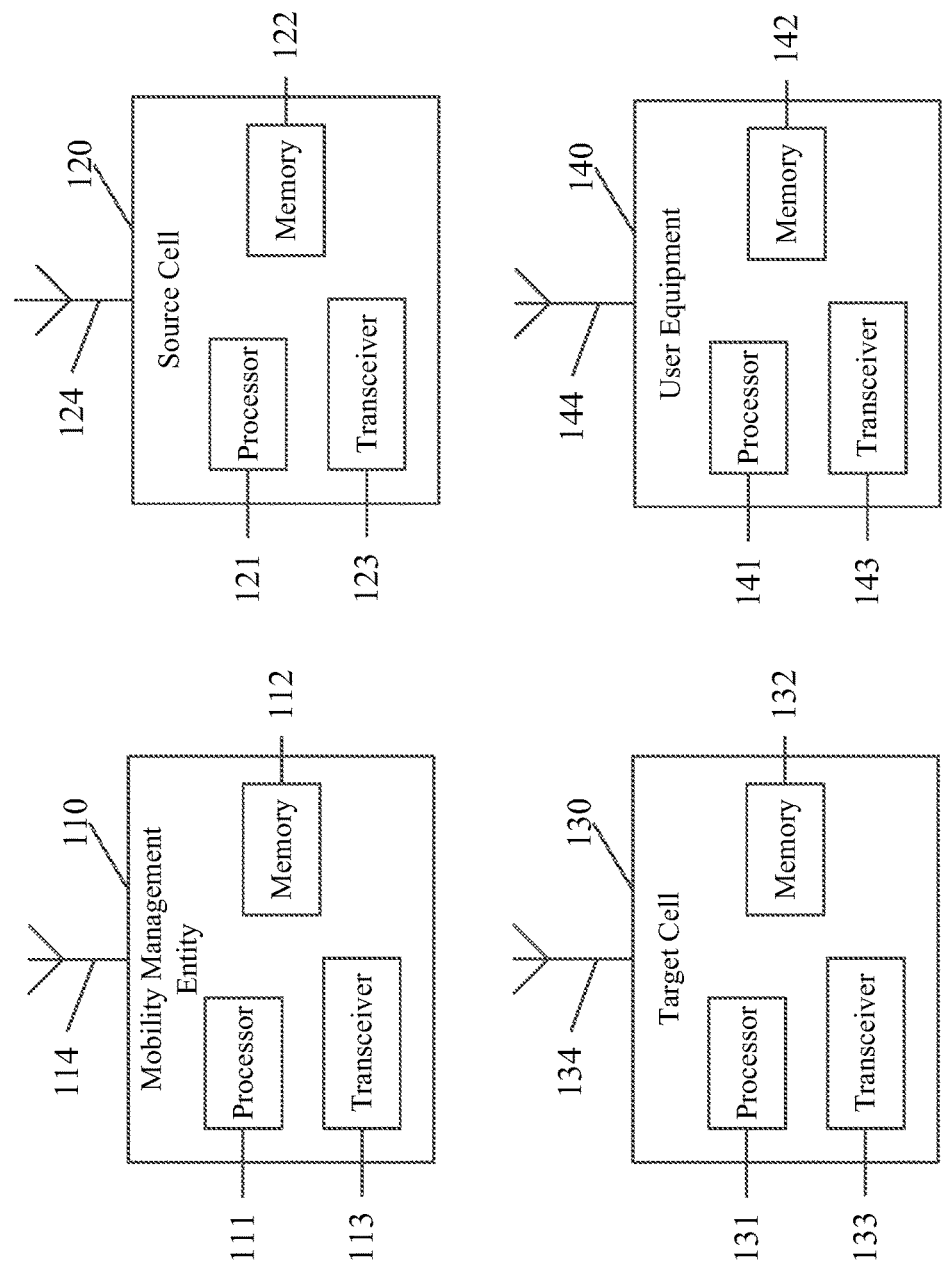
FIG. 1 illustrates an example of a system according to certain embodiments.

The features, structures, or characteristics of certain embodiments described throughout this specification may be combined in any suitable manner in one or more embodiments. For example, the usage of the phrases "certain embodiments," "some embodiments," "other embodiments," or other similar language, throughout this specification refers to the fact that a particular feature, structure, or characteristic described in connection with the embodiment may be included in at least one embodiment of the present invention. Thus, appearance of the phrases "in certain embodiments," "in some embodiments," "in other embodiments," or other similar language, throughout this specification does not necessarily refer to the same group of embodiments, and the described features, structures, or characteristics may be combined in any suitable manner in one or more embodiments.

In some embodiments, the VoLTE retainability from the perspective of the UE may be measured for double next generation (NG)-release scenarios based on an initial context setup request message including a QFI1 QoS Flow bearer with a "QoS Flow to be set up list" field received from an AMF. In response, an initial context setup response message may be sent to the AMF confirming successful establishment of a QFI1 QoS Flow bearer in a target cell. For AMF vendors sending abnormal release cause information for double NG scenarios, a QFI1 QoS Flow drop ratio may be calculated using the following formula:

QFI1 QoS Flow drop ratio=(Number of abnormal QFI1 QoS Flow releases−number of QFI1QoS Flows established after successful double NG for each AMF)/(total number of QFI1QoS Flow Releases (normal and abnormal)).

For AMF vendors sending normal release cause information for double NG scenarios, a QFI1 QoS Flow drop ratio may be calculated using the following formula:

QFI1 QoS Flow drop ratio=(Number of abnormal QFI1 QoS Flow releases−(number of QFI1 QoS Flows related to successful double NG for each AMF−number of QFI1 QoS Flows established after successful double NG for each AMF))/(total number of QFI1 QoS Flow Releases (normal and abnormal)), where "number of QFI1 QoS Flows related to successful double NG for each AMF" corresponds to the number of QFI1 QoS Flow bearers included within "QoS Flow to be set up list" of the initial context setup request message received from an AMF, and "number of QFI1 QoS Flows established after successful double NG for each AMF" corresponds to the number of QFI1 QoS Flow bearers successfully established in the target cell by sending the initial context setup response message to the AMF.

The VoLTE retainability from the perspective of the UE, in some other embodiments, may be measured for double S1-release scenarios based upon an initial context setup request message including a QCI1 evolved packet system radio access bearer (E-RAB) with an "E-RAB to be set up list" received from an MME. In response, an initial context setup response message may be sent to an MME confirming successful establishment of a E-RAB in a target cell.

For MME vendors sending abnormal release cause information for double S1 scenarios according to Table 1 above, a QCI1E-RAB drop ratio may be calculated using the following formula:

QCI1E-RAB drop ratio=(Number of abnormal QCI1E0RAB releases−number of QCI1E-RABs established after successful double S1 for each MME)/(total number of QCI1E-RAB Releases (normal and abnormal)).

For MME vendors sending normal release cause information for double S1 scenarios, a QCI1E-RAB drop ratio may be calculated using the following formula:

QCI1E-RAB drop ratio=(Number of abnormal QCI1E0RAB releases−(number of QCI1E-RABs related to successful double S1 for each MME−number of QCI1E-RABs established after successful double S1 for each MME))/(total number of QCI1E-RAB Releases (normal and abnormal)), where "number of QCI1E-RABs related to successful double S1 for each MME" corresponds to the number of QCI1E-RABs included within "E-RAB to be set up list" of the initial context setup request message received from an MME, and "number of QCI1E-RABs established after successful double S1 for each MME" corresponds to the number of QCI1E-RABs successfully established in the target cell by sending the initial context setup response message to an MME.

In certain embodiments, E-RABs may be categorized in one of two groups. Continuous flow E-RABs may always be active and/or independent of whether there is ongoing traffic, for example, VoIP sessions, real-time sessions, and/or live streaming sessions. Bursty flow E-RABs may be considered active only when there is data in an uplink/downlink buffer, for example, a web session.

Currently, operators that have deployed MMEs from more than one vendor cannot evaluate the perspective of the UE in a double S1 or double NG scenario because each message from the MME would require indications of the MME vendor associated with the message and whether the bearer was successfully established in the target side. Certain embodiments of the present invention may have various benefits and/or advantages. For example, certain embodiments allow a wireless network operator accurately track dropped VoLTE calls. Thus, certain embodiments are directed to improvements in computer-related technology, specifically, by providing techniques for an operator to provide accurate KPI measurements.

FIG. 1 illustrates an example of a system according to certain embodiments. In one embodiment, a system may include multiple devices, such as, for example, mobility management entity (MME) 110, source cell 120, target cell 130, and user equipment (UE) 140.

Source cell 120 and target cell 130 may be one or more of a base station, such as an evolved node B (eNB) or next generation node B (gNB), a next generation radio access network (NG RAN), a serving gateway, a server, and/or any other access node or combination thereof. Furthermore, a citizens broadband radio service (CBRS) device (CBSD) may include one or more a serving cell, such as source cell 120 and target cell 130. UE 140 may include one or more of a mobile device, such as a mobile phone, smart phone, personal digital assistant (PDA), tablet, or portable media player, digital camera, pocket video camera, video game console, navigation unit, such as a global positioning system (GPS) device, desktop or laptop computer, single-location device, such as a sensor or smart meter, or any combination thereof.

One or more of these devices may include at least one processor, respectively indicated as 111, 121, 131, and 141. At least one memory may be provided in one or more of devices indicated at 112, 122, 132, and 142. The memory may be fixed or removable. The memory may include computer program instructions or computer code contained therein. Processors 111, 121, 131, and 141 and memory 112, 122, 132, and 142 or a subset thereof, may be configured to provide means corresponding to the various blocks of FIGS. 2-4. Although not shown, the devices may also include positioning hardware, such as global positioning system (GPS) or micro electrical mechanical system (MEMS) hardware, which may be used to determine a location of the device. Other sensors are also permitted and may be included to determine location, elevation, orientation, and so forth, such as barometers, compasses, and the like.

As shown in FIG. 1, transceivers 113, 123, 133, and 143 may be provided, and one or more devices may also include at least one antenna, respectively illustrated as 114, 124, 134, and 144. The device may have many antennas, such as an array of antennas configured for multiple input multiple output (MIMO) communications, or multiple antennas for multiple radio access technologies. Other configurations of these devices, for example, may be provided.

Transceivers 113, 123, 133, and 143 may be a transmitter, a receiver, or both a transmitter and a receiver, or a unit or device that may be configured both for transmission and reception.

Processors 111, 121, 131, and 141 may be embodied by any computational or data processing device, such as a central processing unit (CPU), application specific integrated circuit (ASIC), or comparable device. The processors may be implemented as a single controller, or a plurality of controllers or processors.

Memory 112, 122, 132, and 142 may independently be any suitable storage device, such as a non-transitory computer-readable medium. A hard disk drive (HDD), random access memory (RAM), flash memory, or other suitable memory may be used. The memories may be combined on a single integrated circuit as the processor, or may be separate from the one or more processors. Furthermore, the computer program instructions stored in the memory and which may be processed by the processors may be any suitable form of computer program code, for example, a compiled or interpreted computer program written in any suitable programming language. Memory may be removable or non-removable.

The memory and the computer program instructions may be configured, with the processor for the particular device, to cause a hardware apparatus such as user equipment to perform any of the processes described below (see, for example, FIGS. 2-4). Therefore, in certain embodiments, a non-transitory computer-readable medium may be encoded with computer instructions that, when executed in hardware, perform a process such as one of the processes described herein. Alternatively, certain embodiments may be performed entirely in hardware.

Figure 2:
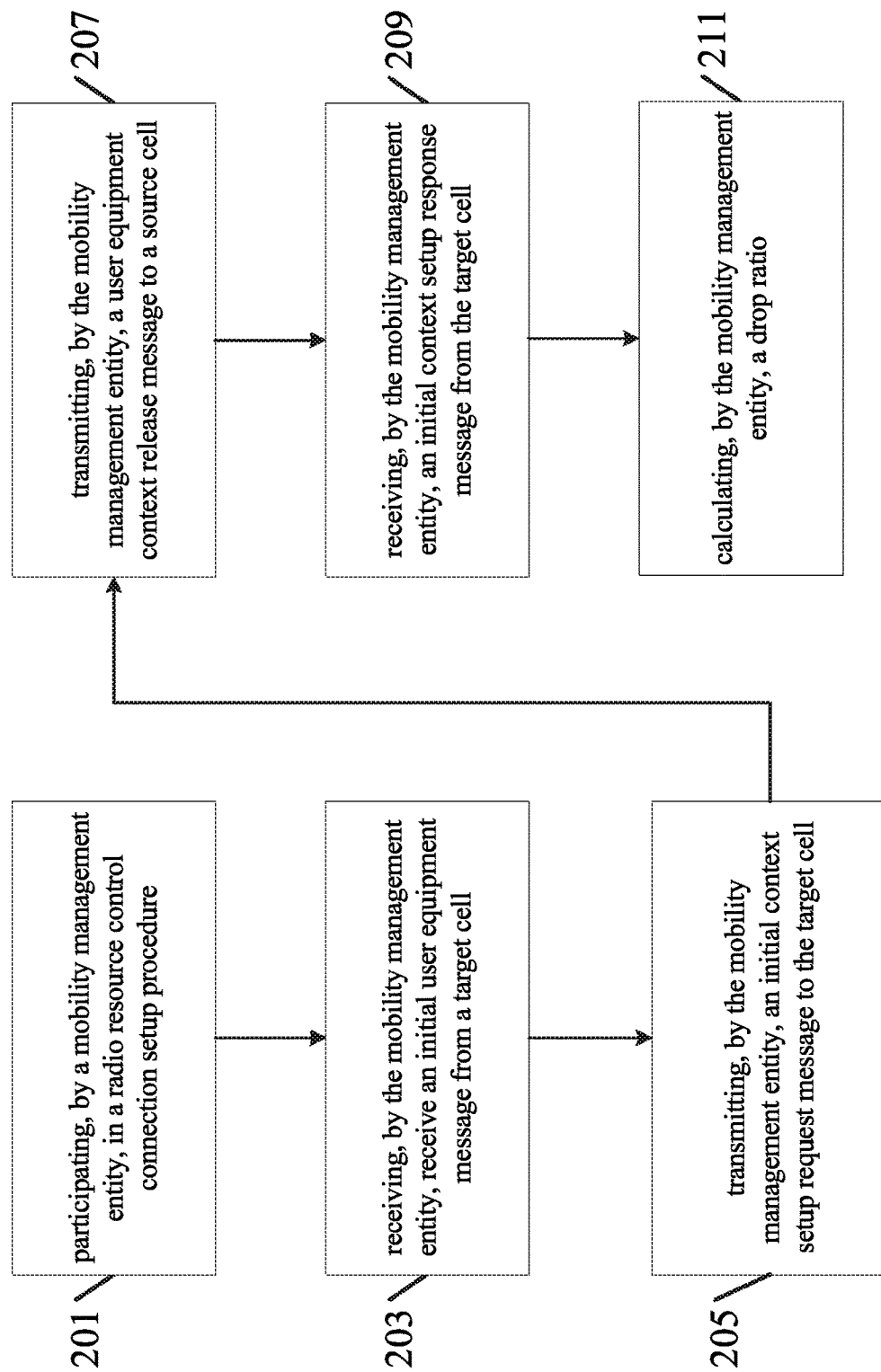
FIG. 2 illustrates an example of a method performed by a mobility management entity according to certain embodiments.
Figure 3:
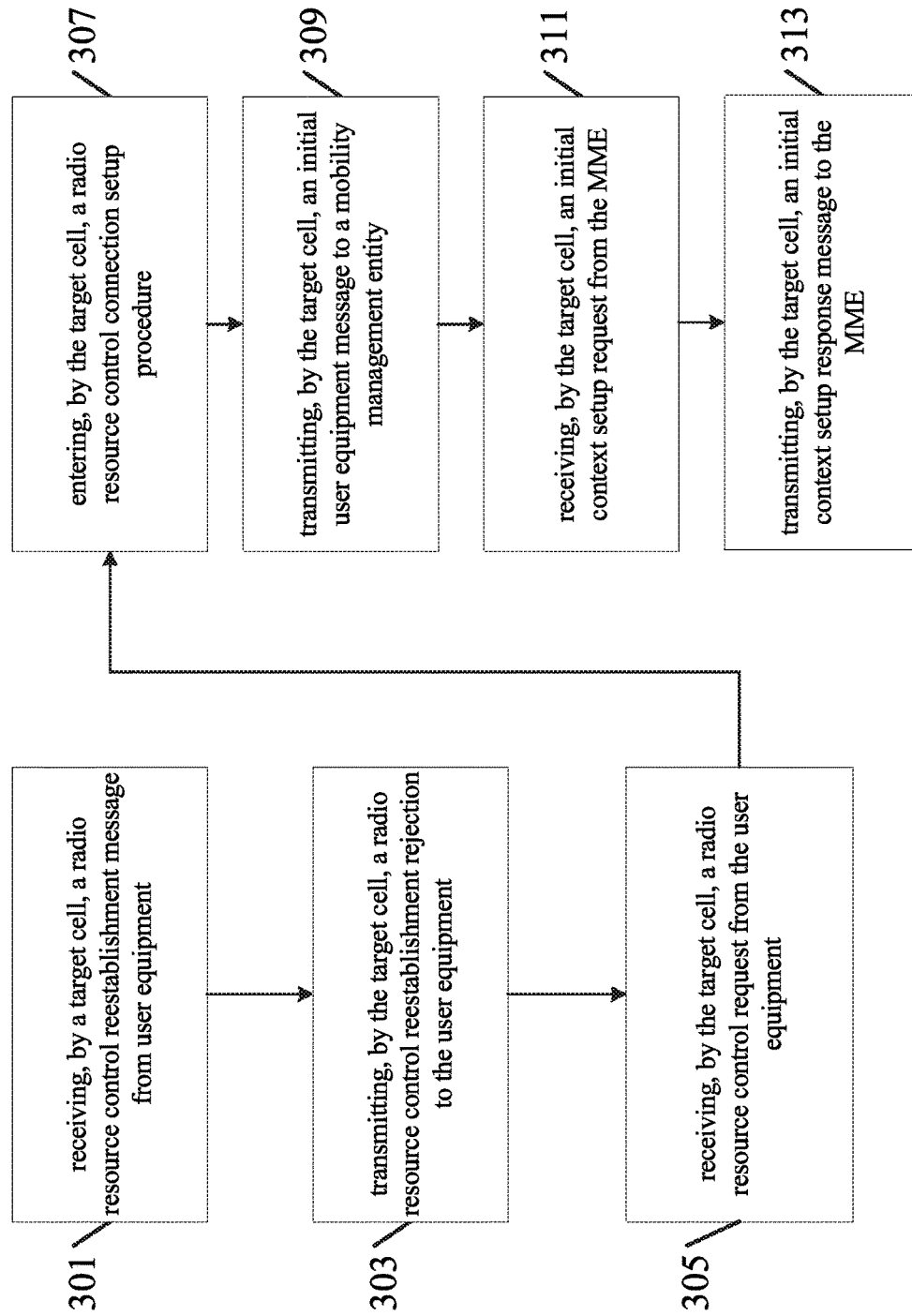
FIG. 3 illustrates an example of a method performed by a target cell according to certain embodiments.
Figure 4:
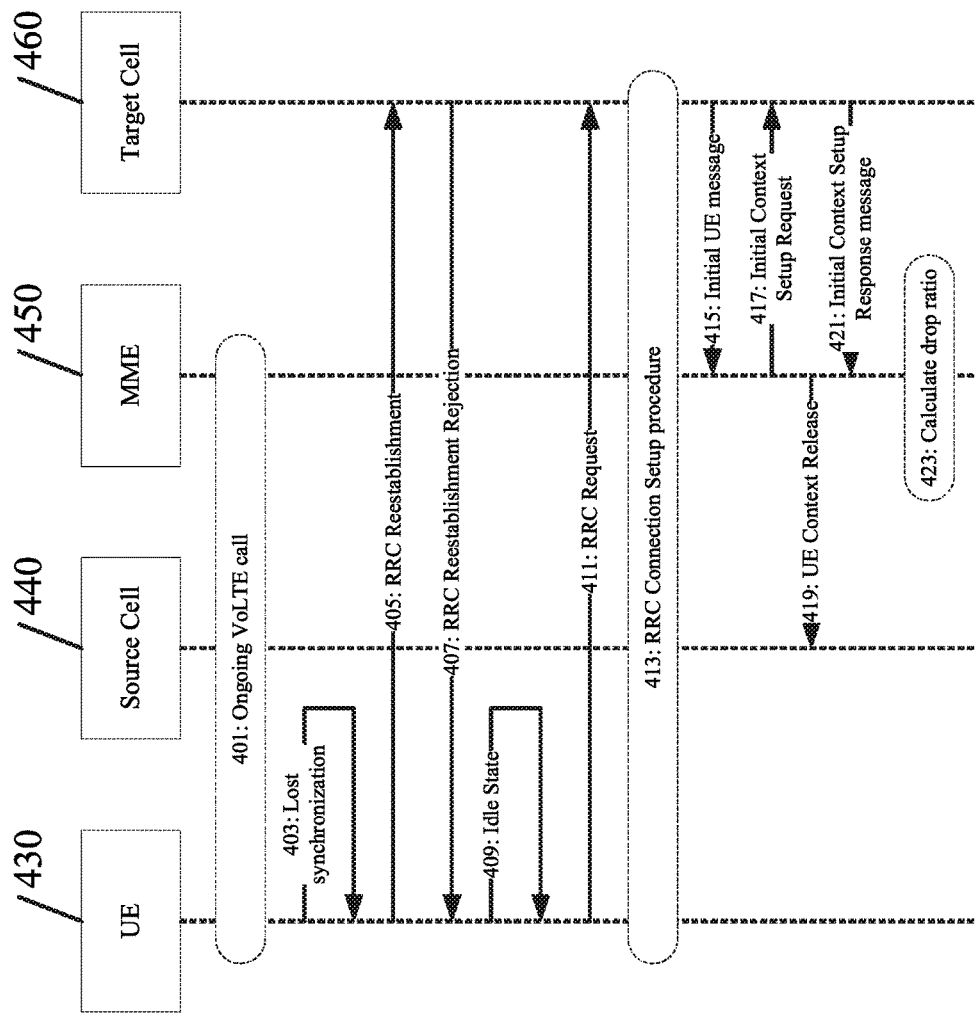
FIG. 4 illustrates an example of a signaling diagram according to certain embodiments.

In certain embodiments, an apparatus may include circuitry configured to perform any of the processes or functions illustrated in FIGS. 2-4. For example, circuitry may be hardware-only circuit implementations, such as analog and/or digital circuitry. In another example, circuitry may be a combination of hardware circuits and software, such as a combination of analog and/or digital hardware circuit(s) with software or firmware, and/or any portions of hardware processor(s) with software (including digital signal processor(s)), software, and at least one memory that work together to cause an apparatus to perform various processes or functions. In yet another example, circuitry may be hardware circuit(s) and or processor(s), such as a microprocessor(s) or a portion of a microprocessor(s), that include software, such as firmware for operation. Software in circuitry may not be present when it is not needed for the operation of the hardware.

FIG. 2 illustrates an example of a method performed by a mobility management entity, similar to MME 110 in FIG. 1, for evaluating voice retainability from an end user perspective in a double S1 and/or double NG network.

In step 201, MME 110 may participate in a radio resource control connection setup procedure. In step 203, the MME may receive an initial user equipment message from a target cell, similar to target cell 130 in FIG. 1. In step 205, the MME may transmit an initial context setup request message to the target cell.

In some embodiments, the initial context setup request may include a QCI1E-RAB request. Some embodiments may measure a number of QCI1 E-RAB release attempts in association with double S1 technology. In certain embodiments, where the initial context setup request transmitted in step 205 contains a QCI1E-RAB request, the number of QCI1E-RAB release attempts associated with double S1 technology may be incremented by any integer, such as one. In some embodiments, QCI1E-RAB release attempt measurements may use the form of QCI1ERAB.RelDoubleS1AttNbr. In some embodiments, the measurement may include cluster and/or public land mobile network (PLMN) measurements. In some embodiments, QCI1E-RAB release attempts measurements may be valid for packet-switched traffic and/or EPS.

In some other embodiments, a number of QFI1 QoS Flow release attempts in association with double next generation (NG) technology may be measured. The initial context setup request may include a QFI1 QoS Flow request. Where the initial context setup request transmitted in step 205 includes a QFI1 QoS Flow request, the number of QFI1 QoS Flow release attempts associated with double NG technology may be incremented by any integer, such as one. The QFI1 QoS Flow release attempt measurements, for example, may use the form of QFI1ERAB.RelDoubleNGAttNbr. The measurement may include cluster and/or public land mobile network (PLMN) measurements. QFI1 QoS Flow release attempts measurements may be valid for packet-switched traffic and/or evolved packet systems (EPS). In some embodiments, CC may be used.

In step 207, the MME may transmit a user equipment context release message to a source cell, similar to source cell 120 in FIG. 1. In step 209, the MME may receive an initial context setup response message from the target cell.

In step 211, the MME may calculate a drop ratio. For MME vendors sending abnormal release cause information for double S1 scenarios according to Table 1 above, the QCI1E-RAB drop ratio may be calculated by using the formula:

> QCI1E-RAB drop ratio=(Number of abnormal QCI1E0RAB releases−number of QCI1E-RABs established after successful double S1 for each MME)/(total number of QCI1E-RAB Releases (normal and abnormal)).

For MME vendors sending normal release cause information for double S1 scenarios, the QCI1E-RAB drop ratio may be calculated by using the formula:

> QCI1E-RAB drop ratio=(Number of abnormal QCI1E0RAB releases−(number of QCI1E-RABs related to successful double S1 for each MME−number of QCI1E-RABs established after successful double S1 for each MME))/(total number of QCI1E-RAB Releases (normal and abnormal)), where "number of QCI1E-RABs related to successful double S1 for each MME" corresponds to the number of QCI1E-RABs included within "E-RAB to be set up list" of the initial context setup request message received from an MME, and "number of QCI1E-RABs established after successful double S1 for each MME" corresponds to the number of QCI1 E-RABs successfully established in the target cell by sending the initial context setup response message to an MME.

For AMF vendors sending abnormal release cause information for double NG scenarios, the QFI1 QoS Flow drop ratio may be calculated by using the formula:

> QFI1 QoS Flow drop ratio=(Number of abnormal QFI1 QoS Flow releases−number of QFI1 QoS Flows established after successful double NG for each AMF)/(total number of QFI1 QoS Flow Releases (normal and abnormal)).

For AMF vendors sending normal release cause information for double NG scenarios, the QFI1 QoS Flow drop ratio may be calculated by using the formula:

> QFI1 QoS Flow drop ratio=(Number of abnormal QFI1 QoS Flow releases−(number of QFI1 QoS Flows related to successful double NG for each AMF−number of QFI1 QoS Flows established after successful double NG for each AMF))/(total number of QFI1 QoS Flow Releases (normal and abnormal)), where "number of QFI1 QoS Flows related to successful double NG for each AMF" corresponds to number of QFI1 QoS Flow bearers included within "QoS Flow to be set up list" of the initial context setup request message received from an AMF, and "number of QFI1 QoS Flows established after successful double NG for each AMF" corresponds to the number of QFI1 QoS Flow bearers successfully established in the target cell by sending the initial context setup response message to an AMF.

FIG. 3 illustrates an example method performed by a target cell, similar to target cell 130 in FIG. 1, for evaluating voice retainability from an end user perspective in a double S1 and/or double NG network. In step 301, a target cell may receive a radio resource control reestablishment message from user equipment, similar to user equipment 140 in FIG. 1. In step 303, the target cell may transmit a radio resource control reestablishment rejection to the user equipment. In step 305, the target cell may receive a radio resource control request from the user equipment. In step 307, the target cell may enter a radio resource control connection setup procedure. In step 309, the target cell may transmit an initial user equipment message to a mobility management entity, similar to MME 110 in FIG. 1. In step 311, the target cell may receive an initial context setup request from the MME. In step 313, the target cell may transmit an initial context setup response to the MME.

FIG. 4 illustrates an example of a signal diagram for evaluating voice retainability from an end user perspective in a double S1 and/or double NG scenario. In step 401, UE 430, similar to user equipment 140 in FIG. 1, may be in connection with source cell 440, similar to source cell 120 in FIG. 1, and/or mobility management entity 450, similar to MME 110 in FIG. 1, to perform a voice of long-term evolution (VoLTE) call.

In step 403, UE 430 may lose synchronization with source cell 440 and/or MME 450. In step 405, UE 430 may send a radio resource control (RRC) reestablishment message to target cell 460, similar to target cell 130 in FIG. 1. In step 407, target cell 460 may send a RRC reestablishment rejection to UE 430. In step 409, UE 430 may enter into an idle state. In step 411, UE 430 may send a RRC request message to target cell 460. In step 413. LIE 430, source cell 440, MME 450, and/or target cell 460 may enter into a RRC connection setup procedure. In step 415, target cell 460 may send an initial UE message to MME 450.

In step 417, MME 450 may send an initial context setup request to target cell 460. Some embodiments may measure a number of QCI1E-RAB release attempts in association with double S1 technology. In some embodiments, the initial context setup request may include a QCI1E-RAB request. In some embodiments, where the initial context setup request received in step 417 contains a QCI1E-RAB request, the number of QCI1E-RAB release attempts associated with double S1 technology may be incremented by any integer, such as one. In some embodiments, QCI1E-RAB release attempt measurements may use the form of QCI1ERAB.RelDoubleS1AttNbr. In some embodiments, the measurements may include cluster and/or PLMN measurements. QCI1E-RAB release attempts measurements may be valid for packet-switched traffic and/or evolved packet systems (EPS).

For example, a number of QFI1 QoS Flow release attempts in association with double NG technology may be measured. The initial context setup request may include a QFI1 QoS Flow request. Where the initial context setup request received in step 417 contains a QFI1 QoS Flow request, the number of QFI1 QoS Flow release attempts associated with double NG technology may be incremented by any integer, such as one. QFI1 QoS Flow release attempt measurements may use the form of QFI1ERAB.RelDoubleNGAttNbr. In some embodiments, the measurement may include cluster and/or public land mobile network (PLMN) measurements. In some embodiments, QFI1 QoS Flow release attempts measurements may be valid for packet-switched traffic and/or evolved packet systems (EPS).

In step 419, MME 450 may send a UE context release message to source cell 440. In some embodiments, the UE context release message may include a MME vendor identifier, one or more cause identifiers, and one or more indications of whether the drop should be considered in key performance indicator (KPI) calculations. In some embodiments, the number of release attempts may be incremented by an integer when one or more of the mobility management entity vendor identifier, cause indicator, and count indicator comprise pre-determined criteria, as shown in Table 1.

In step 421, target cell 460 may send an initial context setup response message to MME 250. In step 423, one or more QCI1E-RAB drop ratios may be calculated. In some embodiments, one or more QCI1E-RAB releases are not considered "abnormal releases," such as a dropped call, by the user equipment, and are not considered as drops when calculating the QCI1E-RAB Drop Ratio. For MME vendors sending abnormal release cause information for double S1 scenarios according to Table 1 above, a QCI1E-RAB drop ratio may be calculated as:

QCI1E-RAB drop ratio=(Number of abnormal QCI1E0RAB releases−number of QCI1E-RABs established after successful double S1 for each MME)/(total number of QCI1E-RAB Releases (normal and abnormal)).

For MME vendors sending normal release cause information for double S1 scenario, a QCI1E-RAB drop ratio may be calculated as:

QCI1E-RAB drop ratio=(Number of abnormal QCI1E0RAB releases−(number of QCI1E-RABs related to successful double S1 for each MME−number of QCI1E-RABs established after successful double S1 for each MME))/(total number of QCI1E-RAB Releases (normal and abnormal)), where "number of QCI1E-RABs related to successful double S1 for each MME" corresponds to the number of QCI1E-RABs included within "E-RAB to be set up list" of the initial context setup request message received from an MME, and "number of QCI1E-RABs established after successful double S1 for each MME" corresponds to the number of QCI1E-RABs successfully established in the target cell by sending the initial context setup response message to an MME.

For AMF vendors sending abnormal release cause information for double NG scenarios, the QFI1 QoS Flow drop ratio may be calculated by using the formula:

QFI1 QoS Flow drop ratio=(Number of abnormal QFI1 QoS Flow releases−number of QFI1 QoS Flows established after successful double NG for each AMF)/(total number of QFI1 QoS Flow Releases (normal and abnormal)).

For AMF vendors sending normal release cause information for double NG scenarios, the QFI1 QoS Flow drop ratio may be calculated by using the formula:

QFI1 QoS Flow drop ratio=(Number of abnormal QFI1 QoS Flow releases−(number of QFI1 QoS Flows related to successful double NG for each AMF−number of QFI1 QoS Flows established after successful double NG for each AMF))/(total number of QFI1 QoS Flow Releases (normal and abnormal)), where the "number of QFI1 QoS Flows related to successful double NG for each AMF" corresponds to the number of QFI1 QoS Flow bearers included within "QoS Flow to be set up list" of the initial context setup request message received from an AMF, and "number of QFI1 QoS Flows established after successful double NG for each AMF" corresponds to the number of QFI1 QoS Flow bearers successfully established in the target cell by sending the initial context setup response message to an AMF.

In certain embodiments, cause values and count indications may be associated with various MME vendors, as shown in Table 1. For example, Nokia may use a cause value of "NAS normal" and count indication of "normal." Cisco may use a cause value of "NAS normal" and count indication of "normal." Alcatel-Lucent may use a cause value of "RNL UE connectivity lost" and count indication of "abnormal." Ericsson may use a cause value of "RNL: E-UTRAN Generated Reason" and count indication of "abnormal."

One having ordinary skill in the art will readily understand that certain embodiments discussed above may be practiced with steps in a different order, and/or with hardware elements in configurations which are different than those which are disclosed. Therefore, it would be apparent to those of skill in the art that certain modifications, variations, and alternative constructions would be apparent, while remaining within the spirit and scope of the invention. In order to determine the metes and bounds of the invention, therefore, reference should be made to the appended claims.

PARTIAL GLOSSARY

3GPP 3rd Generation Partnership Project
AMF Authentication Management Field
BS Base Station
CNI Cell Neighbor Information
CQI Channel Quality Indicator
DL Downlink
DS Doppler Shift
eNB Evolved Node B
EPC Evolved Packet Core
E-RAB Evolved Universal Terrestrial Radio Access Network Radio Access Bearer
eSMLC Evolved Serving Mobile Location Center
E-UTRAN Evolved Universal Terrestrial Radio Access Network
GPS Global Positioning System
gNB Next Generation Node B
HO Handover
LTE Long-Term Evolution
MME Mobility Management Entity
MRO Mobility Robustness Optimization
NG Next Generation
PRS Positioning Reference Signals
RAB Radio Access Bearer
RF Radio Frequency
RLF Radio Link Failure
RNL Radio Network Layer
RRC Radio Resource Control
SIP Session Initiation Protocol
SON Self-Organizing Network
TA Timing Advance
UE User Equipment
VoLTE Voice Over Long-Term Evolution
QCI Quality of Service Class Identifier
QFI Quality of Service Flow Indicator
QoS Quality of Service

We claim:

1. An apparatus, comprising:
   at least one processor; and
   at least one memory including computer program code,
   wherein the at least one memory and the computer program code are configured to, with the at least one processor, cause the apparatus to:
   receive an initial user equipment message from a target cell;
   transmit an initial context setup request message to the target cell;
   receive an initial context setup response message from the target cell; and
   calculate a drop ratio associated with a double S1 connection based upon a number of abnormal radio access bearer releases subtracted from a number of radio access bearer releases associated with a successful double S1 connection divided by a total number of radio access bearer releases, wherein
   the initial context setup response message includes one or more service indicators determined based upon the received initial user equipment message.

2. The apparatus according to claim 1, wherein the drop ratio is calculated as QCI1E-RAB drop ratio=(Number of abnormal QCI1E0RAB releases−number of QCI1E-RABs established after successful double S1 for each MME)/(total number of QCI1E-RAB Releases).

3. The apparatus according to claim 1, wherein the drop ratio is calculated as QCI1E-RAB drop ratio=(Number of abnormal QCI1E0RAB releases−(number of QCI1E-RABs related to successful double S1 for each MME−number of QCI1 E-RABs established after successful double S1 for each MME))/(total number of QCI1E-RAB Releases),
   where "number of QCI1E-RABs related to successful double S1 for each MME" corresponds to the number of QCI1E-RABs included within "E-RAB to be set up list" of the initial context setup request message received from an MME, and "number of QCI1E-RABs established after successful double S1 for each MME" corresponds to the number of QCI1E-RABs successfully established in the target cell by sending the initial context setup response message to an MME.

4. The apparatus according to claim 1, wherein the drop ratio is calculated as QFI1 QoS Flow drop ratio=(Number of abnormal QFI1 QoS Flow releases−number of QFI1 QoS Flows established after successful double NG for each AMF)/(total number of QFI1 QoS Flow Releases).

5. The apparatus according to claim 1, wherein the drop ratio is calculated as QFI1 QoS Flow drop ratio=(Number of abnormal QFI1 QoS Flow releases−(number of QFI1 QoS Flows related to successful double NG for each AMF−number of QFI1 QoS Flows established after successful double NG for each AMF))/(total number of QFI1 QoS Flow Releases),
   where "number of QFI1 QoS Flows related to successful double NG for each AMF" corresponds to number of QFI1 QoS Flow bearers included within "QoS Flow to be set up list" of the initial context setup request message received from an AMF, and "number of QFI1 QoS Flows established after successful double NG for each AMF" corresponds to the number of QFI1 QoS Flow bearers successfully established in the target cell by sending the initial context setup response message to an AMF.

6. The apparatus according to claim 5, wherein the user equipment context release message contains one or more of a mobility management entity vendor identifier, a cause indicator, and a count indicator.

7. The apparatus according to claim 6, wherein the number of release attempts is incremented by an integer when one or more of the mobility management entity vendor identifier, cause indicator, and count indicator comprise pre-determined criteria.

8. The apparatus according to claim 1, wherein one or more QCI1E-RAB release attempt measurements are in the form of QCI1ERAB.RelDoubleS1AttNbr.

9. The apparatus according to claim 1, wherein one or more QFI1 QoS Flow release attempt measurements are in the form of QFI1ERAB.RelDoubleNGAttNbr.

10. The apparatus according to claim 1, wherein one or more QCI1E-RAB release attempts measurements may be valid for packet-switched traffic and/or evolved packet systems.

11. An apparatus, comprising:
    at least one processor; and
    at least one memory including computer program code,
    wherein the at least one memory and the computer program code are configured to, with the at least one processor, cause the apparatus to:
    transmit an initial user equipment message to a mobility management entity;
    receive an initial context setup request; and
    transmit an initial context setup response message to the mobility management entity including one or more service indicators,
    wherein the one or more service indicators are related to a calculation of a drop ratio associated with a double S1 connection based upon a number of abnormal radio access bearer releases subtracted from a number of radio access bearer releases associated with a successful double S1 connection divided by a total number of radio access bearer releases.

12. The apparatus according to claim 11, wherein the at least one memory and the computer program code are configured to, with the at least one processor, further cause the apparatus to:
    receive a radio resource control reestablishment message from user equipment.

13. The apparatus according to claim 11, wherein the at least one memory and the computer program code are configured to, with the at least one processor, further cause the apparatus to:
    transmit a radio resource control reestablishment rejection to the user equipment.

14. The apparatus according to claim 11, wherein the at least one memory and the computer program code are configured to, with the at least one processor, further cause the apparatus to:
    receive a radio resource control request from the user equipment.

15. The apparatus according to claim 11, wherein a number of release attempts is tracked and incremented by any integer.

16. The apparatus according to claim 15, wherein when the initial context setup request contains a QCI1E-RAB request, the number of release attempts is incremented by an integer.

17. The apparatus according to claim 11, wherein one or more QCI1E-RAB release attempt measurements are in the form of QCI1ERAB.RelDoubleS1AttNbr.

18. The apparatus according to claim 11, wherein one or more QFI1 QoS Flow release attempt measurements are in the form of QFI1ERAB.RelDoubleNGAttNbr.

19. The apparatus according to claim 11, wherein one or more QCI1E-RAB release attempts measurements may be valid for packet-switched traffic and/or evolved packet systems.

20. The apparatus according to claim 11, wherein the at least one memory and the computer program code are configured to, with the at least one processor, further cause the apparatus to:
   prior to transmitting the initial user equipment message, entering a radio resource control connection setup procedure.

\* \* \* \* \*